United States Patent
Masson et al.

(10) Patent No.: US 10,742,720 B2
(45) Date of Patent: Aug. 11, 2020

(54) CLOUD STORAGE ACCELERATOR

(71) Applicant: Seagate Technology LLC, Cupertino, CA (US)

(72) Inventors: Bruno Masson, Campbell, CA (US); Terrin Eager, Campbell, CA (US); Ludovic Raulet, Saint-Cyr l'ecole (FR); Timothy Bucher, Geyserville, CA (US)

(73) Assignee: Seagate Technology LLC, Fremont, CA (US)

( * ) Notice: Subject to any disclaimer, the term of this patent is extended or adjusted under 35 U.S.C. 154(b) by 421 days.

(21) Appl. No.: 15/445,581

(22) Filed: Feb. 28, 2017

(65) Prior Publication Data

US 2017/0251050 A1   Aug. 31, 2017

Related U.S. Application Data

(60) Provisional application No. 62/301,615, filed on Feb. 29, 2016.

(51) Int. Cl.
*H04L 29/08* (2006.01)
*H04W 72/04* (2009.01)

(52) U.S. Cl.
CPC .............. *H04L 67/10* (2013.01); *H04L 67/06* (2013.01); *H04L 67/1097* (2013.01); *H04L 67/2847* (2013.01); *H04L 67/2857* (2013.01)

(58) Field of Classification Search
CPC . H04L 67/1097; H04L 67/10; H04L 67/2857; H04L 67/2847; H04L 67/06; G06F 3/0601
See application file for complete search history.

(56) References Cited

U.S. PATENT DOCUMENTS

| | | | | |
|---|---|---|---|---|
| 9,167,313 B1* | 10/2015 | Bacco | ............... | H04N 21/812 |
| 2003/0195940 A1* | 10/2003 | Basu | ............... | G06F 16/9574 |
| | | | | 709/213 |
| 2010/0121910 A1* | 5/2010 | Kim | ............... | H04L 45/00 |
| | | | | 709/203 |
| 2012/0317379 A1* | 12/2012 | Ali | ............... | G06F 13/28 |
| | | | | 711/158 |
| 2013/0218838 A1* | 8/2013 | Bevan | ............... | G06N 5/04 |
| | | | | 707/626 |
| 2015/0317176 A1* | 11/2015 | Hussain | ............... | G06F 3/067 |
| | | | | 718/1 |

* cited by examiner

*Primary Examiner* — Soe Hlaing

(57) ABSTRACT

Systems and methods are disclosed for accelerating the delivery of a data file. The data file may be uploaded to a content accelerator connected to a local area network. At some later point in time, the data file may be uploaded to a cloud storage provider based on the status of the network between the content accelerator and the cloud storage provider.

19 Claims, 6 Drawing Sheets

CLOUD STORAGE ACCELERATOR

RELATED APPLICATIONS

The present application claims priority to U.S. Patent Application Ser. No. 62/301,615 filed Feb. 29, 2016, and titled "Cloud Storage Accelerator" which is hereby incorporated by reference for all that it discloses or teaches.

SUMMARY

Systems and methods are disclosed for accelerating the delivery of content or data from a network data source to a device on a local area network. A content accelerator device may be in communication with the local area network and may predict the future data needs for various user devices on the local area network. Predicted data may be downloaded to the content accelerator and provided to the user device when the predicted data is requested by a user device.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed for accelerating the delivery of content or data from a network data source to a device on a local area network. A content accelerator device may be in communication with the local area network and may predict the future data needs for various user devices on the local area network. Predicted data may be downloaded to the content accelerator and provided to the user device when the predicted data is requested by a user device.

Figure 1:
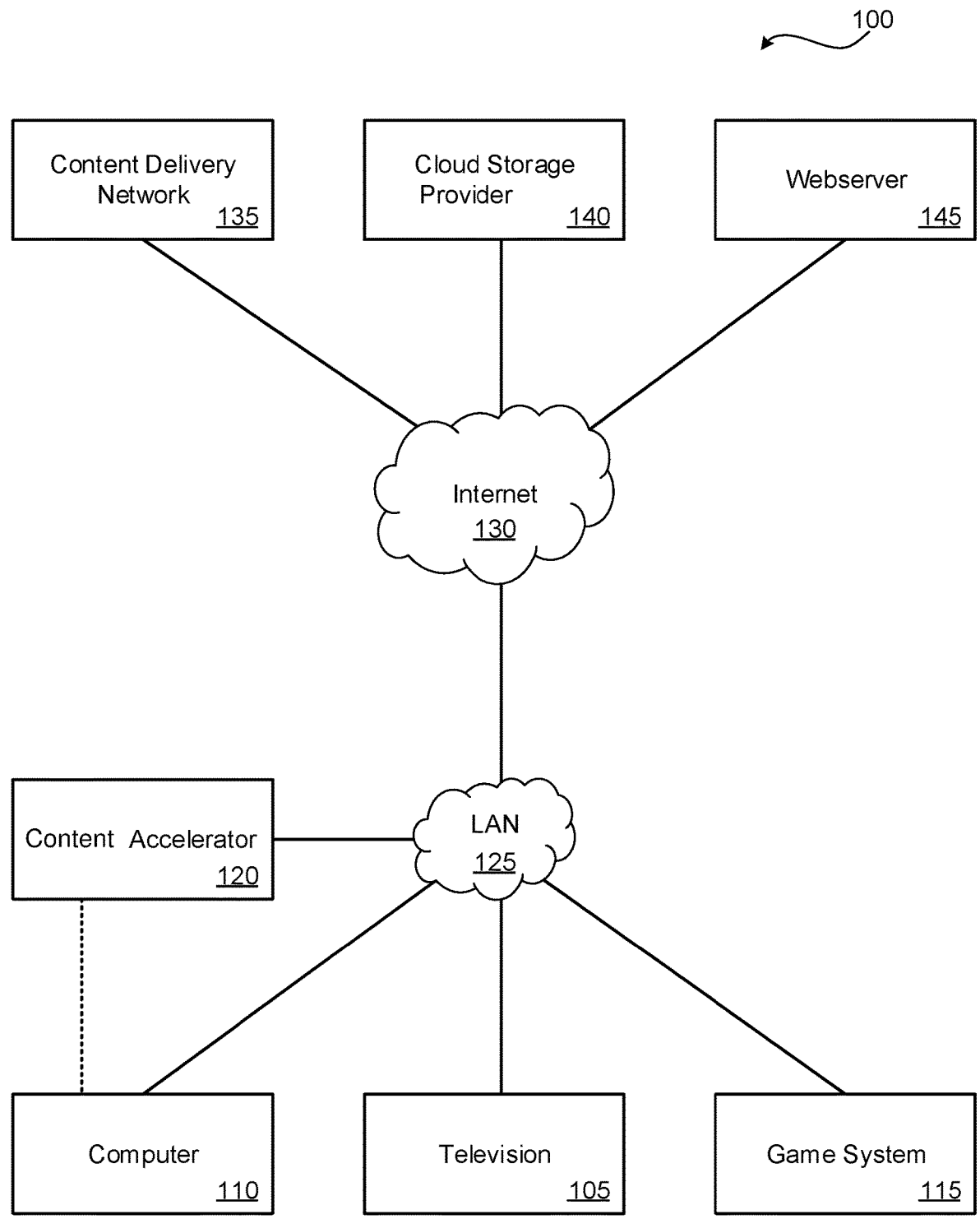
FIG. 1 is a block diagram of a network system according to some embodiments.

FIG. 1 is a block diagram of a network system 100 according to some embodiments. The network system 100 may include a local area network 125 in communication with the Internet 130. The local area network (LAN) 125 may be in communication and/or may include with any number of user devices such as, for example, a television 105, a computer 110, and/or a game system 115. Various other user devices may be connected or in communication with the local area network, such as local storage devices. The local area network 125 may be in communication with a content accelerator 120. The Internet 130 may be in communication with any number of network data sources such as, for example, a content delivery network 135, a cloud storage provider 140, and/or a webserver 145. Various other network data sources may also be connected with the Internet.

In some embodiments, the local area network 125 may include, either alone or in any suitable combination an Intranet, a local Wi-Fi network, a wireless LAN, a mobile network (e.g., a 3G, 4G, and/or LTE network), a WAN, a wired network, or any other suitable communication network.

In some embodiments, the content accelerator 120 may include a storage device, a network interface, hardware controller and/or a processor. In some embodiments, the content accelerator 120 may include any or all of the components of the computational system 600 shown in FIG. 6. The content accelerator 120 may include any or all the components describe in conjunction with computational system 600. The network interface may provide the content accelerator 120 with access to the local area network 125 and/or the Internet 130. The network interface may be a wired or wireless network interface. The storage device may be used to store anticipated data from any network data sources coupled with the Internet. The processor may be used to determine the anticipated data demands for devices coupled with the local area network and retrieve the data from the corresponding network data sources.

In some embodiments, the content accelerator 120 may be directly coupled with the computer 110. In some embodiments, the content accelerator 120 may be coupled with the USB of the computer 110.

In some embodiments, the storage device of the content accelerator may include any type of storage medium such as, for example, a solid state drive, magnetic hard disk drive, flash memory, a spinning disk, a hybrid magnetic/flash storage device, etc.

In some embodiments, the content accelerator 120 may monitor data requirements for the various user devices (e.g., the television 105, the computer 110, and/or the game system 115) and anticipate future data requirements for the various user devices. The content accelerator 120 may request and store the anticipated data within the content accelerator in anticipation of a future request for the data. When a user device requests data from one of the network data sources that is saved on the content accelerator 120, the data may be sent from the content accelerator to the user device rather than from the network data source. In this way, for example, some data may be stored locally and delivered more quickly to the user device.

Various processes or algorithms may be followed to protect the intellectual property rights or the copyrights of the content temporarily stored at the content accelerator 120.

For example, some data may be encrypted when stored at the content accelerator 120. The data may be decrypted only when delivery of the data to a user device is approved by the network data source where the data was originally stored. For example, a user may be viewing a series of television shows that are each individually purchased and streamed to a user device. In anticipation of the user wanting to purchase and stream a future television show, the content accelerator 120 may download one or more televisions shows in the series of televisions shows to the content accelerator 120.

Then, when the user requests the television show from the network data source the television show may be streamed from the content accelerator 120 rather than the network data source. In some embodiments, the content accelerator 120 may request permission or be granted permission from the network data source prior to streaming the television show to the user device. In some embodiments, the content accelerator 120 may be given a key that may be used to decrypt the television show when streaming the television show from the content accelerator 120. In some embodiments, the user device may be given a key that may be used to decrypt the television show when streaming the television show from the content accelerator 120. In some embodiments, data stored at the content accelerator 120 may be deleted after it is consumed by a user or after set period of time. In some embodiments, a user may not be able to access data or some data stored at the content accelerator 120 unless permission has been granted by the network data source.

In some embodiments, the content accelerator 120 may be partitioned in to a plurality of storage locations that may be managed or used by different network data sources. For example, the content accelerator 120 may include a first partition for content provided by Netflix, a second partition for content provided by Apple, a third partition for content provided by Amazon, fourth partition for content provided by Hulu, etc. The various partitions may allow different levels of user interaction through the local area network, provide different levels or security, and/or require different levels of permission prior to delivery of the content to a user device.

In some embodiments, a user can't access some or all content stored on the content accelerator 120 unless the content was stored in the content accelerator by the user, or permission is granted by the network data source, or the user devices provides the proper authentication or decryption, etc.

In some embodiments, the content accelerator 120 may be coupled with or may be part of a server, switch, gateway, router, user device, etc. of the local area network.

In some embodiments, the content accelerator 120 may be coupled with a computer device that is connected with the local area network 125. For example, the content accelerator 120 may be an external hard drive coupled with a computer. The computer, for example, may include software or algorithms that perform the functions of the content accelerator 120.

In some embodiments, the content accelerator 120 may be in communication with both the Internet 130 and the local area network 125. In some embodiments, the content accelerator 120 may be independently in communication with either or both the Internet 130 and the local area network 125.

In some embodiments, the network system 100 may include a plurality of network data sources such as, for example, one or more content delivery networks 135, one or more cloud storage providers 140, and/or one or more webservers interacting with hardware controllers.

In some embodiments, the content delivery network 135 may be a distributed network of proxy servers deployed in multiple data centers. In some embodiments, the content delivery network 135 may serve content to user devices with high availability and high performance. In some embodiments, the content delivery network 135 may provide web objects (e.g., text, graphics and scripts), downloadable objects (e.g., media files, software, documents, etc.), applications (e.g., e-commerce, portals), live streaming media, on-demand streaming media, and social networks to user devices through the Internet 130 and/or the local area network 125. In some embodiments, the content delivery network 135 may be located at an internet service provider location or the like. In some embodiments, the content delivery network 135 may be a peer-to-peer content delivery network, a private content delivery network, a dedicated content delivery network, a federated content delivery network, telecom content delivery network, etc. In some embodiments, the content delivery network 135 may include a streaming service or provider. In some embodiments, an API may be used at the user device and/or the content accelerator 120 to retrieve data from the content delivery network 135.

In some embodiments, the cloud storage provider 140 may include a plurality of cloud storage locations and/or remote storage devices, a cloud computing device, a cloud data center, a server, etc. Any type of content may be saved within the cloud storage provider 140. In some embodiments, an API may be required to retrieve data from the cloud storage provider 140.

In some embodiments, the webserver 145 may include a network accessible server that may provide web content that may include HTML documents, XML documents, script documents, web applications, e-commerce applications, documents, music, video, images, etc. In some embodiments, an API may be required to retrieve data from the webserver 145.

In some embodiments, a network data source may include an email server, a peer to peer server, etc.

In some embodiments, a user device may include any type of device such as, for example, a television 105, a computer 110 (e.g., a laptop or desktop), a game device 115, a smart phone, a tablet, an audio playback device, a video playback device, etc. The television, for example, may present content to a user via a display. The content, for example, may be a video streamed from the content delivery network 135. The content, for example, may be a webpage provided by the webserver 145.

In some embodiments, the computer 110 may access any type of content or data accessible from the network data sources (e.g., the content delivery network 135, the cloud storage provider 140, and/or the webserver 145). The computer 110, for example, may request files from the cloud storage provider 140. The computer 110, for example, may stream audio and/or video from the content delivery network 135. The computer 110, for example, may access a website and/or web content hosted by the webserver 145. In some embodiments, the computer 110 may also upload content to the cloud storage provider 140, the web server 145, and/or the content delivery network 135 via the content accelerator 120.

Figure 2:
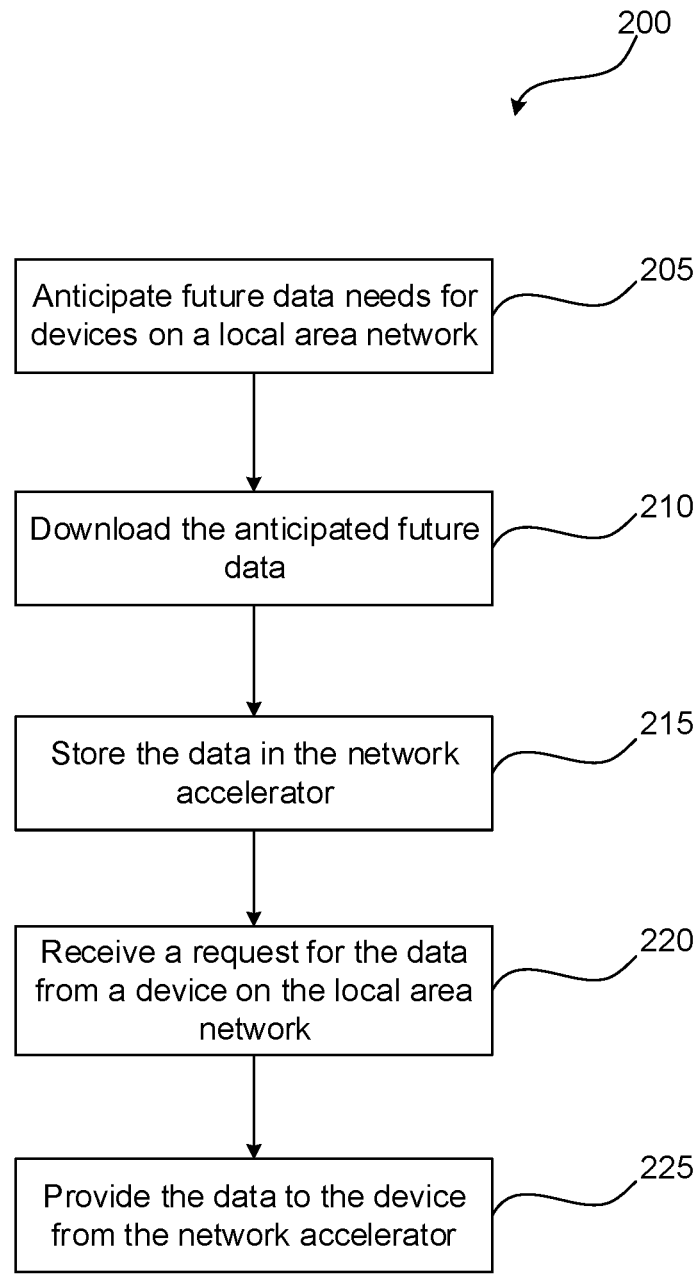
FIG. 2 is a flowchart of an example process for using a data accelerator in a local area network according to some embodiments.

FIG. 2 is a flowchart of an example process 200 for using a data accelerator in a local area network according to some embodiments. One or more steps of the process 200 may be implemented, in some embodiments, by one or more components of network system 100 of FIG. 1, such as, for example, content accelerator 120. Although illustrated as discrete blocks, various blocks may be divided into additional blocks, combined into fewer blocks, or eliminated, depending on the desired implementation.

Process 200 starts at block 205. At block 205 the content accelerator 120 may anticipate the predicted future data of one or more user devices (e.g., 105, 110, or 115) on the local area network 125. The content accelerator 120, for example, may anticipate the predicted future data in any number of ways. For example, the content accelerator 120 may sample data passing through the local area network 125 to determine the current data usage. Alternatively or additionally the content accelerator 120 may communicate with a router or switch to determine the current data usage. The content accelerator 120 may predict the predicted future data of the one or more devices based on the current data usage of the one or more devices.

Alternatively or additionally, software executing on one or more of the user devices, for example, may communicate the current data usage and/or the predicted future data to the content accelerator 120.

The predicted future data may be predicted based on any number of factors. In some embodiments, the predicted future data may include an overly broad prediction of the future data needs of the user devise on the local area network 125.

In some embodiments, the predicted future data may be predicted based on the current data usage and/or previous data usage and/or data usage trends. For example, if a user is streaming an episode of a television series, then it can be anticipated that the user may choose to stream other episodes of the television series such as, for example, the next episode in the series of episodes. As another example, if a user watches a new movie every Friday night, it may be anticipated that the use may watch a movie the upcoming Friday night. A plurality of movies may be anticipated, for example, based on the type of movies previously viewed by the user, the actors in the previously viewed movies, the rating of the previously viewed movies, the newness of the previously viewed movies, the genre of the previously viewed movie, the director of the previously viewed movies, critic's opinion of the previously viewed movies, awards won by previously viewed movies, etc.

In some embodiments, the predicted future data may be predicted based on the time of day. For example, it may be predicted that the user typically works during set hours of the day. It may be anticipated prior to the set hours that the predicted future data of the user includes work related documents.

In some embodiments, the predicted future data may include data that is typically streamed and/or downloaded.

In some embodiments, the predicted future data may include a listing of predicted future data that is organized by probability of being consumed by a user of a device on the local area network 125.

At block 210 the predicted future data may be downloaded to the local area network based on any number or combination of factors. In some embodiments, the predicted future data may be downloaded when the network traffic in the local area network is low, for example, to ensure that the local area network is not overly congested or slowed down. In some embodiments, the predicted future data may be downloaded during specific hours when the traffic on the local area network 125 is low such as, for example, during the night or during work hours.

In some embodiments, the predicted future data may be downloaded in an order based on the probability that a user of a device on the local area network 125 may consume the anticipated future data. The predicted future data that have a higher probability of being consumed first may be downloaded prior to other anticipated future data In some embodiments, the predicted future data may be downloaded based on the network speed between the local area network 125 and the storage location where the predicted future data is found (e.g., the content delivery network 135, the cloud storage provider 140, and the webserver 145). For example, if the network conditions between a storage location of a specific predicted future data and the local area network is slow, then the specific predicted future data may be downloaded to the local area network 125 before other anticipated future data.

At block 215 the predicted future data may be stored at the content accelerator 120.

At block 220 a device on the local area network may require or request data from the content delivery network 135, the cloud storage provider 140, the webserver 145, and/or any other network data sources. In some embodiments, the user device on the local area network may request the data from the content accelerator 120. For example, the content accelerator 120 may communicate the various data that is available at the content accelerator 120. When the data is required, the user device may know that the data is stored on the content accelerator 120 and may simply request the data from the content accelerator 120. In response, the requested data may be provided (e.g., downloaded or streamed) to the user device at block 225.

Alternatively or additionally, the user device on the local area network may request the data from both the content accelerator 120 and the network data source (e.g., the content delivery network 135, the cloud storage provider 140, and/or the webserver 145). If the requested data is saved on the content accelerator 120, then the data may be provided (e.g., downloaded or streamed) to the user device at block 225.

Alternatively or additionally, the user device on the local area network may request the data from the network data source (e.g., the content delivery network 135, the cloud storage provider 140, and/or the webserver 145). The content accelerator 120 may intercept the request or receive a copy of the request such as, for example, from a router or a user device. If the requested data is saved on the content accelerator 120, then the data may be provided (e.g., downloaded or streamed) to the user device at block 225.

Alternatively or additionally, the user device on the local area network may request the data from the network data source (e.g., the content delivery network 135, the cloud storage provider 140, and/or the webserver 145). In response, the network data source may begin delivering the data to the user device. The content accelerator 120 may monitor the data on the local area network and, once the delivery of the data from the network data source has begun, the content accelerator 120 may deliver the remainder of the data to the user device.

In some embodiments, the availability of data at the content accelerator 120 may be restricted or limited based on any number of conditions. For example, some data on the content accelerator 120 may only be accessed from a specific application or webpage. For example, certain movies may only be delivered if they are requested by a certain application executing on a user device or a webpage rendered by a web browser on the user device.

As another example, data may be delivered to the user device only if access to the data is granted by the data source. Access may be granted in response to a request form the content accelerator 120 or the user device.

In some embodiments, data saved on the content accelerator 120 may include an expiration date and/or time. When the expiration date and/or time has expired, the data may be deleted.

In some embodiments, the data saved on the content accelerator 120 may not be directly accessible by a user device. For example, a user may not be able to view or access data files on the content accelerator 120 from a data management application executing on the user device. In some embodiments, the content accelerator 120 may be partitioned into two partitions. In one partition, the data may be directly accessible by a user. In another partition, predicted network data may be stored and used for network acceleration.

Figure 3:
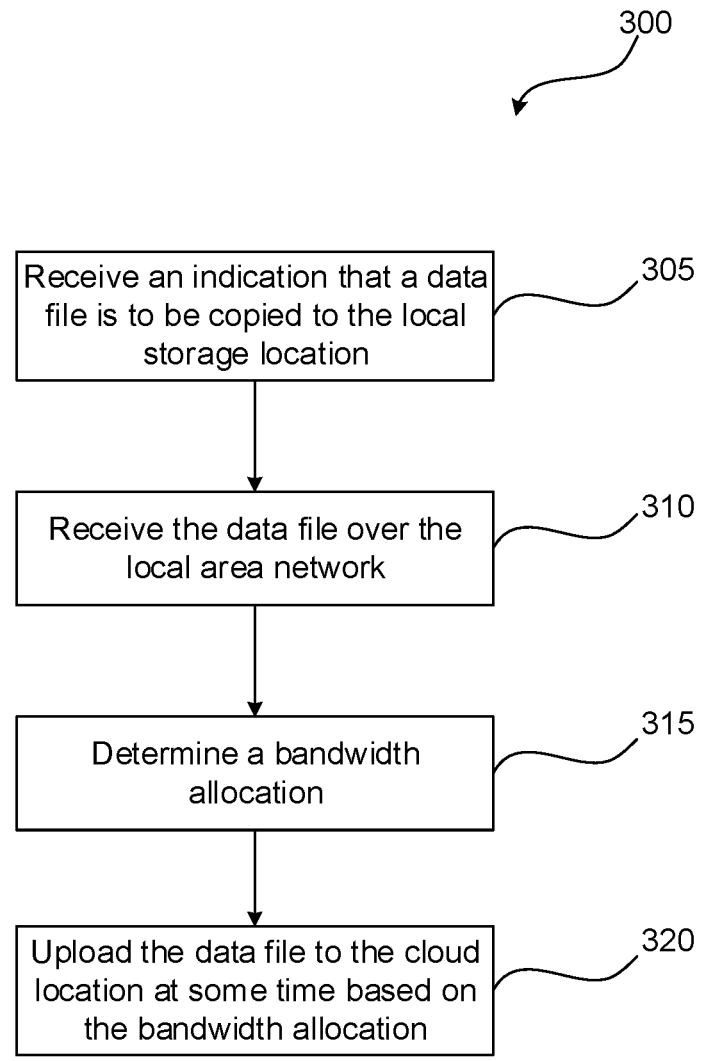
FIG. 3 is a flowchart of an example process for using a data accelerator in a local area network according to some embodiments

FIG. 3 is a flowchart of an example process for using a data accelerator in a local area network according to some embodiments. One or more steps of the process 300 may be implemented, in some embodiments, by one or more components of network system 100 of FIG. 1, such as, for example, content accelerator 120. Although illustrated as discrete blocks, various blocks may be divided into additional blocks, combined into fewer blocks, or eliminated, depending on the desired implementation.

Process 300 begins at block 305. At block 305 an indication that a data file is to be copied to the local storage location (or content accelerator 120). The data file, for example, may be any type of data file and may be received from the computer 110 (or the television 105, or the gaming system 115). The data file may be received over the local area network 125.

In some embodiments, the indication may include metadata about the data file. For example, the metadata may include one or more of a user account information, a username, a password, encryption information, directory information, folder information, account number, file name, file type, file size, etc.

At block 310 the data file may be received at the content accelerator 120 from the computer 110 over the local area network 125.

At block 315 a bandwidth allocation may be determined by the content accelerator 120. The bandwidth allocation may include any information about the Internet 130 and/or the network path between the content accelerator 120 and the cloud storage provider 140. In some embodiments, the bandwidth allocation may include the data transfer speed, the bandwidth, the upload time per byte of data, time of day, day of the week, the cost per upload bandwidth, file size, file type, etc. In some embodiments, the bandwidth allocation may be determined by referencing a lookup table. The look up table may be populated, for example, with data about the network based on the network speed, upload rate, upload speed, time of the data, usage, load, etc.

In some embodiments, a test data packet (e.g., a ping) may be sent to the cloud storage provider. The bandwidth allocation may be determined based on the amount of time a return message is transmitted back to the content accelerator 120.

At block 320 the data file is uploaded to the cloud storage provider from the content accelerator 120 over the Internet 140. The data file may be uploaded over time based on the results of the bandwidth allocation.

For example, if the bandwidth allocation comprises an upload bandwidth that is below a threshold value, then the data file may be uploaded at a later period of time when the bandwidth is above the threshold value. In some embodiments, a portion of the data file may be uploaded at a given period of time when the bandwidth allocation is below the threshold value.

In some embodiments, in the event that the bandwidth allocation is greater than the threshold value the uploading of the data file may be paused until the bandwidth allocation is below the threshold value.

In some embodiments, the bandwidth allocation may be a variable cost per kilobyte (or other size) uploaded over time. If the cost is below a threshold cost then the data file may be uploaded. If the cost is above a threshold cost then the data file may not be uploaded or the uploading of the data file may be paused.

In some embodiments, the data file may be encrypted at the content accelerator 120 prior to sending the data file to the cloud storage provider 140.

In some embodiments, the metadata may be uploaded to the cloud storage provider 140 prior to uploading the data file. In some embodiments, the metadata may be uploaded regardless of the bandwidth allocation.

In some embodiments, the bandwidth allocation may depend on two or more characteristics of a bandwidth allocation. For example, the bandwidth allocation may depend on the size of the data file and a cost per file size. In some embodiments, the bandwidth allocation may only be determined for data files above a threshold file size.

In some embodiments, if the bandwidth allocation is less than a threshold value and the data file has not been uploaded for a specific period of time (e.g., 24 hours), then the threshold value may be lowered at given intervals (e.g., 24 hours) until the bandwidth allocation is less than the threshold value and the data file may be uploaded.

Figure 4:
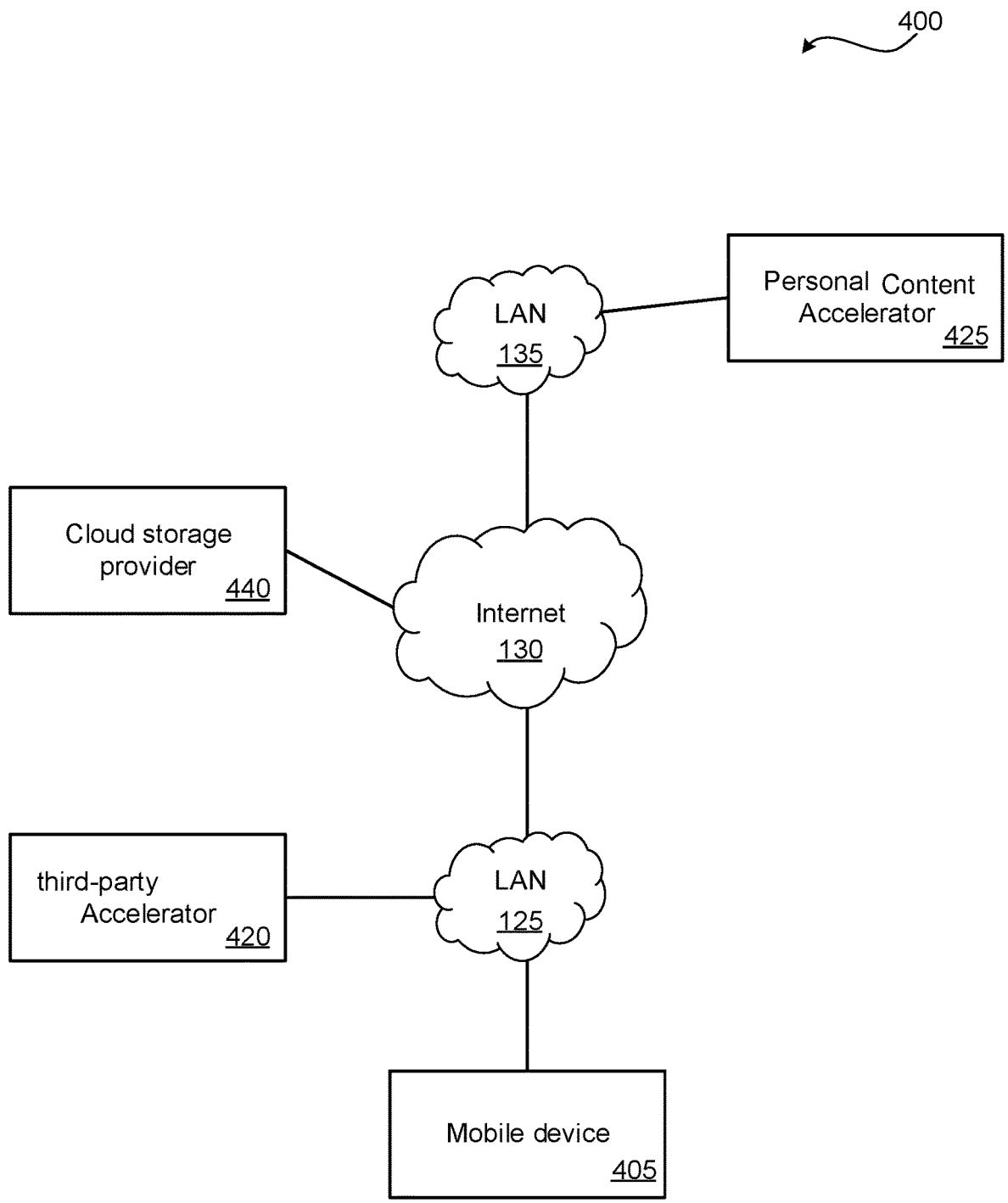
FIG. 4 is a block diagram of a network system according to some embodiments.

FIG. 4 is a block diagram of a network system 400 according to some embodiments. The network system 400 may include a mobile device 405 (e.g., computer 110), third-party accelerator 420 (e.g., content accelerator 120), local area network 125, Internet 130, local area network 136, personal content accelerator 425 (e.g., content accelerator 120), and the cloud storage provider 440 (e.g., cloud storage provider 140). In some embodiments, the mobile device 405 may be associated with the personal content accelerator 425. For example, user account information may be entered with both the mobile device 405 and the content accelerator 425. As another example, the mobile device 405 may have in storage the internet address (e.g., the IP address) of the personal content accelerator 425 in memory.

In some embodiments, the third-party content accelerator 420 is not associated with the personal content accelerator and/or the mobile device 405. In some embodiments, the user of the mobile device 405 may not have access to data, folder, files, etc. on the third-party content accelerator 420. The mobile device 405 may be connected to the local area network 125 and may be able to "see" the third-party content accelerator 420 on the local area network 115.

In some embodiments, the user of the mobile device 405 may transfer a data file from the mobile device 405 to the personal content accelerator 425 via the third-party content accelerator 420.

Figure 5:
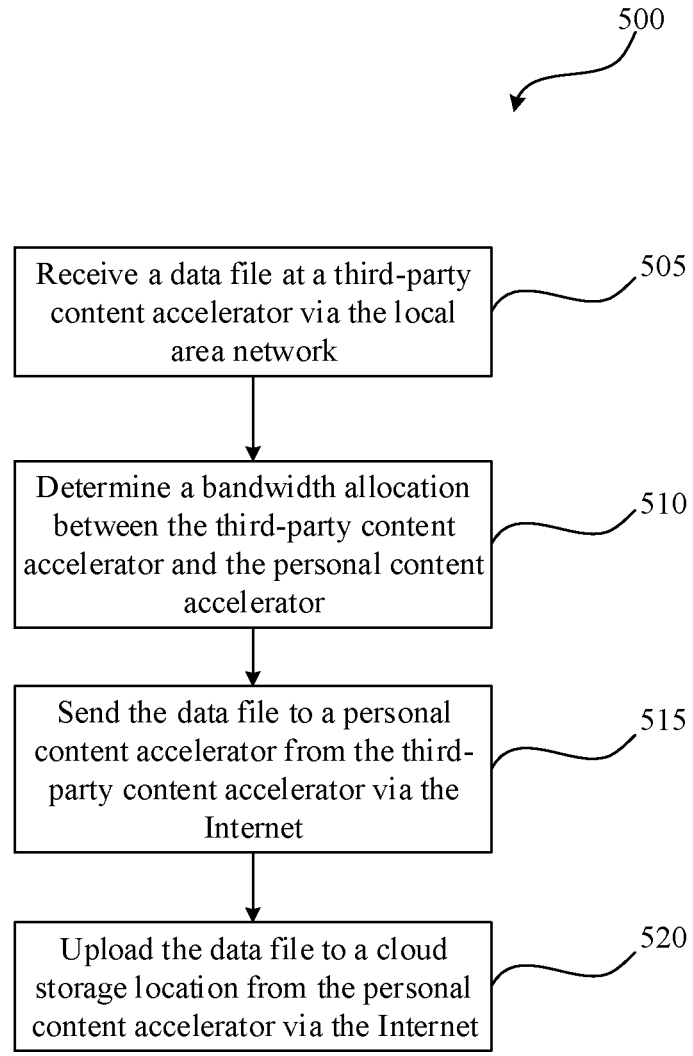
FIG. 5 is a flowchart of an example process for using a data accelerator in a local area network according to some embodiments

FIG. 5 is a flowchart of an example process for using a data accelerator in a local area network according to some embodiments. One or more steps of the process 500 may be implemented, in some embodiments, by one or more components of network system 400 of FIG. 4. Although illustrated as discrete blocks, various blocks may be divided into additional blocks, combined into fewer blocks, or eliminated, depending on the desired implementation.

Process 500 begins at block 505. At block 505 a data file may be received from the mobile device 405 at the third-party content accelerator 420 via the local area network 115. In some embodiments, the data file may include metadata as noted elsewhere in this document. In some embodiments, the metadata may be received prior to receiving the data file. In some embodiments, the metadata may include information about the personal content accelerator 425 such as, for example, the network address of the personal content accelerator 425, the name of the personal content accelerator 425, the username associated with the user and/or the mobile device 405, etc.

In some embodiments, the data file may be stored at the third-party content accelerator 420. In some embodiments, the data file may be encrypted prior to being sent to the third-party content accelerator 420. In some embodiments, the data file may be stored at the third-party content accelerator 420 such that a user of the third-party content accelerator 420 may not be able to access the data file through an operating system or a file management program executing on the third-party content accelerator 420.

At block 510 a network allocation between the third-party content accelerator 420 and the personal content accelerator 425. The network allocation may include any type of network allocation including those discussed elsewhere in this document. In some embodiments, the network allocation may include a network path that includes the local area network 115, the Internet 125, and the local area network 136.

At block 515 the data file may be sent to the personal content accelerator 425 via the local area network 125, the Internet 130 and/or the local area network 136 if the network allocation is below (or above) a threshold value. The network allocation may include any network allocation discussed within this document and the threshold value may include any threshold value discussed within this document.

At block 520 the data file may be uploaded to the cloud storage provider 440 from the personal content accelerator 425 via the Internet 130. In some embodiments, the data file may not be uploaded until a network allocation between the personal content accelerator 425 and the cloud storage provider 440 is less (or greater) than a threshold value.

In some embodiments, the data file may be encrypted prior to being uploaded to the third-party content accelerator 420, prior to uploading to the personal content accelerator 425, and/or prior to uploading to the cloud storage provider 440.

In some embodiments, the process 500 may also include receiving metadata for the data file at the third-party content accelerator 420. From the metadata determining that the user associated with the data file is not associated with the third-party content accelerator 420. A network location of the personal content accelerator 425 may be determine based on the metadata.

In some embodiments, the process 500 may also include receiving an indication at the third-party content accelerator 420 from the personal content accelerator 425 that the data file has been received at the personal content accelerator 425. Afterwards, the third-party content accelerator 420 may delete the data file.

In some embodiments, the process 300 and/or the process 500 may upload more than one data files to a cloud storage provider or a content accelerator based on an optimization process. The optimization process, for example, may be based on the file size of the more than one data files, bandwidth allocations, commodity costs of the files and/or the network, encryption of the more than one data files, compression techniques of the more than one data files, etc.

Figure 6:
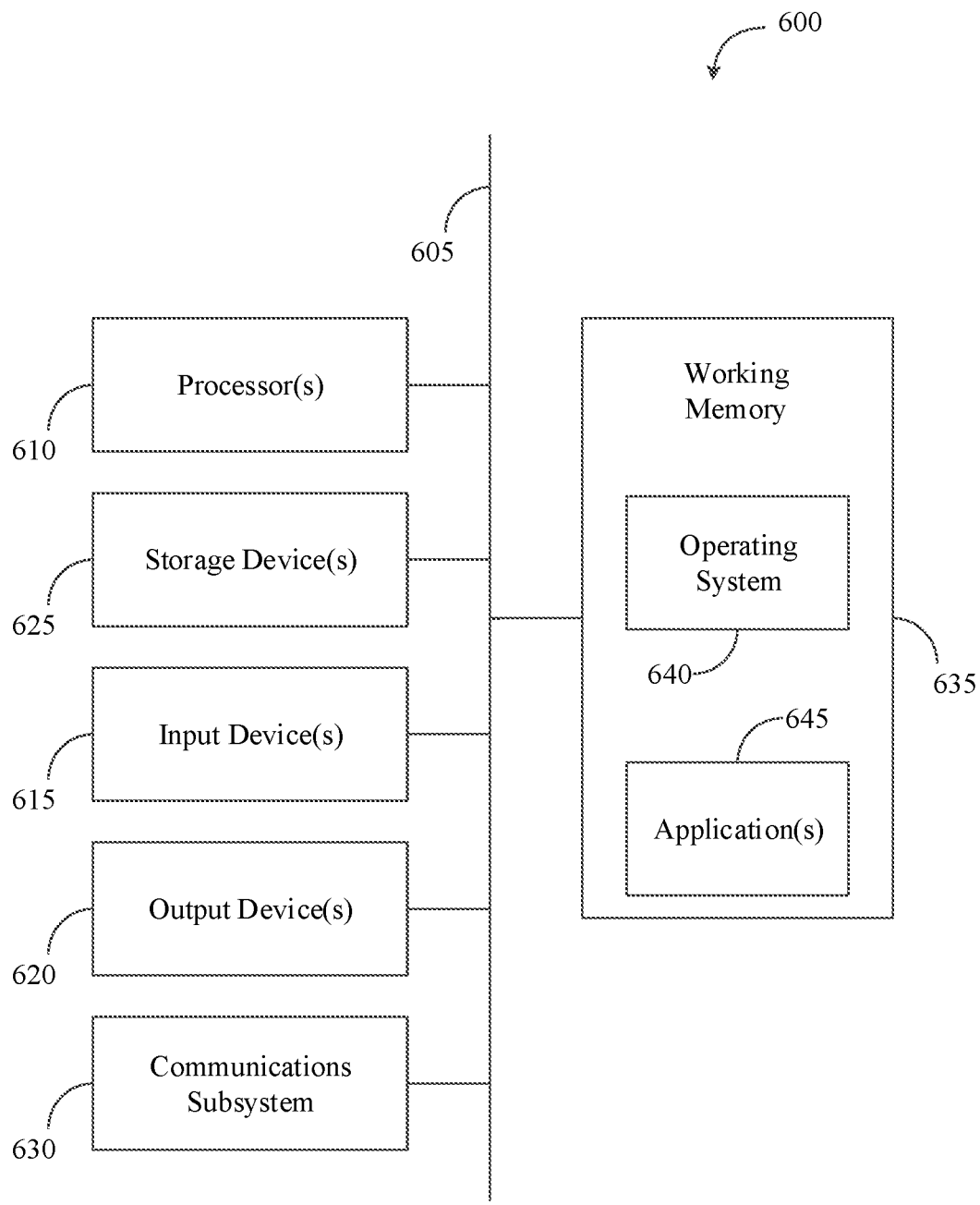
FIG. 6 shows an illustrative computational system for performing functionality to facilitate implementation of embodiments described herein.

The computational system 600 (or processing unit) illustrated in FIG. 6 can be used to perform and/or control operation of any of the embodiments described herein. For example, the computational system 600 can be used alone or in conjunction with other components. As another example, the computational system 600 can be used to perform any calculation, solve any equation, perform any identification, and/or make any determination described here.

The computational system 600 may include any or all of the hardware elements shown in the figure and described herein. The computational system 600 may include hardware elements that can be electrically coupled via a bus 605 (or may otherwise be in communication, as appropriate). The hardware elements can include one or more processors 610, including, without limitation, one or more general-purpose processors and/or one or more special-purpose processors (such as digital signal processing chips, graphics acceleration chips, and/or the like); one or more input devices 615, which can include, without limitation, a mouse, a keyboard, and/or the like; and one or more output devices 620, which can include, without limitation, a display device, a printer, and/or the like.

The computational system 600 may further include (and/or be in communication with) one or more storage devices 625, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 600 might also include a communications subsystem 630, which can include, without limitation, a modem, a network card (wireless or wired), an infrared communication device, a wireless communication device, and/or chipset (such as a Bluetooth® device, a 802.6 device, a Wi-Fi device, a WiMAX device, cellular communication facilities, etc.), and/or the like. The communications subsystem 630 may permit data to be exchanged with a network (such as the network described below, to name one example) and/or any other devices described herein. In many embodiments, the computational system 600 will further include a working memory 635, which can include a RAM or ROM device, as described above.

The computational system 600 also can include software elements, shown as being currently located within the working memory 635, including an operating system 640 and/or other code, such as one or more application programs 645, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 625 described above.

In some cases, the storage medium might be incorporated within the computational system 600 or in communication with the computational system 600. In other embodiments, the storage medium might be separate from the computational system 600 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.), then takes the form of executable code.

The term "substantially" means within 5% or 10% of the value referred to or within manufacturing tolerances.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

We claim:

1. A system comprising:
   a local storage device connected to a local area network; and
   a hardware controller connected to the local storage device and configured to monitor traffic between the local storage device and a user device on the local area network, wherein via the local area network includes the hardware controller, the local storage device, and the user device, and wherein the hardware controller is configured to:
   store a first data file to the local storage device in response to receiving the first data file from the user device via the local area network;
   determine an external network bandwidth allocation between the local storage device and a remote storage device;
   transfer at least a portion of the first data file from the local storage device to the remote storage device via the external network when the external network bandwidth allocation is less than a predetermined amount;
   predict a second data file that will be requested by the user device;
   store the second data file to the local storage device in response to receiving the second data file from the remote storage device;
   monitor data transferred on the local area network;
   determine a first portion of the second data file was transferred to the user device from the remote storage device; and
   transfer a second portion of the second data file from the local storage device to the user device in response to determining that the first portion of the second data file was transferred to the user device from the remote storage device.

2. The system of claim 1, wherein the hardware controller is configured to determine the external network bandwidth allocation by sending a test message from the local storage device to the remote storage device and receiving a response message form the remote storage device.

3. The system of claim 1, wherein the hardware controller is configured to: responsive to determining that the external network bandwidth allocation is greater than the predetermined amount, pausing the transfer of the portion of the first data file or waiting until the external network bandwidth allocation is less than the predetermined amount prior to transferring at least the portion of the first data file to the remote storage device.

4. The system of claim 1, wherein the external network bandwidth allocation comprises a time of day or an external network connectivity cost per period of time and the predetermined amount comprises a period of time or a cost per period of time.

5. The system of claim 1, wherein the first data file is encrypted prior to transferring it to the remote storage device.

6. The system of claim 1, wherein the hardware controller is further configured to delete the second data file from the local storage device in response to determining that a user of the user device consumed the second date file.

7. The system of claim 1, wherein the hardware controller is further configured to delete the second data file from the local storage device in response to determining that an expiration date for the second date file has occurred.

8. The system of claim 1, wherein the hardware controller is configured to transfer the second portion of the second date file to the user device in further response to determining that the user device is authorized to access the second data file.

9. The system of claim 1, wherein the hardware controller is further configured to transfer the second portion of the second date file to the user device in further response to determining that an application requesting the second data file is authorized to receive the second data file.

10. The system of claim 1, wherein the remote storage device is a first remote storage device, wherein the hardware controller is further configured to store the second data file to a first partition of the local storage device, and wherein the hardware controller is further configured to store a third data file received from a second remote storage device to a second partition that is different than the first partition.

11. The system of claim 1, wherein the hardware controller is further configured to predict the second data file based on one or more of current data usage or previous data usage of the user device.

12. A method comprising:
storing, by a hardware controller that is configured to monitor traffic between a local storage device and a user device on a local area network, a first data file to the local storage device in response to receiving the first data file from the user device via a local area network, wherein the local area network includes the hardware controller, the local storage device, and the user device;
determining, by the hardware controller, an available bandwidth of an external network between the local storage device and a cloud storage location;
uploading, by the hardware controller, at least a portion of the first data file to the cloud storage location via the external network when the available bandwidth is greater than a predetermined amount;
predicting, by the hardware controller, a second data file that will be requested by the user device;
storing, by the hardware controller, the second data file to the local storage device in response to receiving the second data file from the remote storage device;
monitoring, by the hardware controller, data transferred on the local area network;
determining, by the hardware controller, a first portion of the second data file was transferred to the user device from the remote storage device; and
transferring, by the hardware controller, a second portion of the second data file from the local storage device to the user device in response to determining that the first portion of the second data file was transferred to the user device from the remote storage device.

13. The method according to claim 12, further comprising:
responsive to determining that the available bandwidth is less than the predetermined amount, pausing the uploading of the portion of the first data file or waiting until the available bandwidth is greater than the predetermined amount prior to uploading the portion of the first data file to the cloud storage location.

14. The method according to claim 12, wherein the available bandwidth comprises an upload speed of the external network between the local storage device and the cloud storage location, and the predetermined amount comprises an upload speed.

15. The method according to claim 12, wherein determining the available bandwidth of the external network between the local storage device and the cloud storage location comprises sending a test message from the local storage device to the cloud storage location and receiving a response message from the cloud storage location.

16. The method according to claim 12, wherein the bandwidth comprises an external network connectivity cost per period of time, and the predetermined amount comprises a cost per period of time.

17. The method according to claim 12, wherein the available bandwidth comprises an external network connectivity cost per data size, and the predetermined amount comprises a cost per data size.

18. The method according to claim 12, further comprising:
creating metadata for the first data file, the metadata comprising at least one of the following: user account information, encryption information, directory information, folder information, account number, file name, file type or file size; and
uploading the metadata prior to uploading the portion of the first data file to the cloud storage location.

19. A system comprising:
a local storage device connected to a local area network; and
a hardware controller connected to the local storage device and configured to monitor traffic between the local storage device and a user device on the local area network, wherein the local area network includes the hardware controller, the local storage device, and the user device, and wherein the hardware controller is configured to:
predict a data file that will be requested by the user device;
store the data file to the local storage device in response to receiving the data file from a remote storage device;
monitor data transferred on the local area network;
determine a first portion of the data file was transferred to the user device from the remote storage device; and
transfer a second portion of the data file from the local storage device to the user device in response to determining that the first portion of the data file was transferred to the user device from the remote storage device.

* * * * *